(12) United States Patent
Connor

(10) Patent No.: US 12,333,632 B2
(45) Date of Patent: Jun. 17, 2025

(54) IMAGE PROCESSING SYSTEM AND METHOD

(71) Applicant: Sony Interactive Entertainment Inc., Tokyo (JP)

(72) Inventor: Patrick John Connor, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 215 days.

(21) Appl. No.: 18/161,961

(22) Filed: Jan. 31, 2023

(65) Prior Publication Data
US 2023/0252693 A1    Aug. 10, 2023

(30) Foreign Application Priority Data

Feb. 8, 2022 (GB) ...................................... 2201584

(51) Int. Cl.
| | |
|---|---|
| *G06T 11/00* | (2006.01) |
| *A63F 13/52* | (2014.01) |
| *G06T 1/20* | (2006.01) |

(52) U.S. Cl.
CPC ............ *G06T 11/001* (2013.01); *A63F 13/52* (2014.09); *G06T 1/20* (2013.01)

(58) Field of Classification Search
CPC . G06T 11/001; G06T 1/20; G06T 3/04; G06T 11/40; G06T 11/00; G06T 15/00; A63F 13/52
See application file for complete search history.

(56) References Cited

U.S. PATENT DOCUMENTS

| | | |
|---|---|---|
| 7,750,913 B1 | 7/2010 | Parenteau et al. |
| 11,138,747 B1 * | 10/2021 | Seiler ........................ G06T 7/90 |
| 2004/0207622 A1 | 10/2004 | Deering et al. |
| 2006/0152509 A1 | 7/2006 | Heirich |

(Continued)

FOREIGN PATENT DOCUMENTS

| | | |
|---|---|---|
| EP | 4009279 A1 | 6/2022 |
| EP | 4224407 A1 | 8/2023 |

OTHER PUBLICATIONS

Search Report for corresponding GB Application No. 2209978.2, 4 pages, dated Dec. 1, 2022.

(Continued)

*Primary Examiner* — Daniel F Hajnik
*Assistant Examiner* — Chris Alejandro Puntier
(74) *Attorney, Agent, or Firm* — Kilpatrick Townsend & Stockton LLP

(57) ABSTRACT

An image processing system operable to generate one or more images for display, the system comprising a rendering unit operable to render one or more of a plurality of textures using flexible scale rasterization, FSR, a metadata generation unit operable to generate metadata indicating one or more properties of the FSR used to render a corresponding texture, a shader compiler operable to read the metadata, and to modify a shader to enable a texture sampling to be performed that includes an FSR resolve where the metadata indicates that a corresponding texture has been rendered with FSR, and an image generation unit operable to generate an image for display using at least one modified shader, the generated image including one or more of the plurality of textures.

14 Claims, 3 Drawing Sheets

(56) References Cited

U.S. PATENT DOCUMENTS

| | | | |
|---|---|---|---|
| 2011/0148894 A1* | 6/2011 | Duprat | G06T 11/001 |
| | | | 345/552 |
| 2012/0306877 A1 | 12/2012 | Rosasco | |
| 2013/0021358 A1 | 1/2013 | Nordlund et al. | |
| 2015/0287166 A1* | 10/2015 | Cerny | G06T 17/10 |
| | | | 345/423 |
| 2015/0287230 A1 | 10/2015 | Cerny | |
| 2016/0225118 A1 | 8/2016 | Nevraev et al. | |
| 2016/0307297 A1 | 10/2016 | Akenine-Moller | |
| 2018/0276790 A1 | 9/2018 | Mantor | |
| 2019/0347757 A1 | 11/2019 | Selvik et al. | |
| 2019/0347763 A1 | 11/2019 | Goel et al. | |
| 2020/0193650 A1* | 6/2020 | Fielding | G06T 11/40 |
| 2020/0218346 A1 | 7/2020 | Eash | |
| 2020/0380756 A1 | 12/2020 | Glanville | |
| 2021/0133478 A1 | 5/2021 | Leonardi | |
| 2021/0158629 A1 | 5/2021 | Breugelmans | |
| 2021/0236938 A1 | 8/2021 | Withey | |
| 2021/0272348 A1 | 9/2021 | Berghoff | |

OTHER PUBLICATIONS

Examination Report for related GB Application No. 2209978.2, 4 pages, dated Jun. 24, 2024.
Search Report for corresponding GB Application No. 2201584.6, 4 pages, dated Aug. 2, 2022.
Extended European Search Report for related EP Application No. 23154179.8, 9 pages, dated Jun. 29, 2023.
Extended European Search Report for corresponding EP Application No. 23152055.2, 9 pages, dated Jun. 29, 2023.
NVIDIA: "Nvidia Turing GPU Architecture" URL:https://www.nvidia.com/content/dam/enzz/Solutions/design-visualization/technologies/turing-architecture/NVIDIA-Turing-Architechture-Whitepaper.pdf. vol. 1, 86 pages, dated Jan. 1, 2018 (for relevancy see Non-Pat. Lit #1 and 2).
U.S. Appl. No. 18/161,978, "Non-Final Office Action", Mar. 13, 2025, 27 pages.
U.S. Appl. No. 18/161,961, "Non-Final Office Action", Nov. 20, 2024, 16 pages.
U.S. Appl. No. 18/161,961, "Notice of Allowance", Mar. 5, 2025, 7 pages.

* cited by examiner

IMAGE PROCESSING SYSTEM AND METHOD

FIELD OF THE INVENTION

This disclosure relates to an image processing system and method.

DESCRIPTION OF THE PRIOR ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years, the demand for high-quality video and video game content has increased. This is driven in part by the demand for immersive content, such as content for display with a virtual reality (VR) headset, as well as the fact that high-quality displays are more widespread amongst consumers. However, the provision of such content is associated with the requirement for ever-increasing processing power—and this may be problematic when using hardware that is not updated frequently (such as a games console) or is limited in processing power due to other considerations such as cost or portability. The provision of suitably immersive VR content in particular is associated with expensive image processing operations.

It is therefore considered that rather than relying on an increase in the capabilities of the hardware used to generate and provide such content, it may be preferable to optimise the content and/or the content generation process. By optimising the content and/or content generation process, it is anticipated that the amount of processing power that is required is reduced or the quality of content is improved while utilising the same amount of processing power. That is, the ratio of content quality to required processing power may be improved by the optimisation.

One such technique is that of foveal rendering. This comprises the rendering of images for display such that a particular focal area is provided with a higher quality than those areas of the image outside that focal area. The focal area may be determined based upon in-content cues and/or eye gaze tracking (or a prediction of the user's likely gaze position) within the image display area.

The difference in image quality is usually reflected in the reduction of the image resolution in the non-focal areas relative to the focal areas, reducing the resolution of the image as a whole. This can result in a substantial saving in the amount of processing required to generate images for display.

Similar methods may also be considered for non-VR content, or for content display systems in which eye tracking is not available—such content is also a suitable candidate for optimisation, rather than being limited to only gaze-dependent foveal rendering.

It is therefore considered that alternative or additional optimisations may be appropriate in the context of generating images for display.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
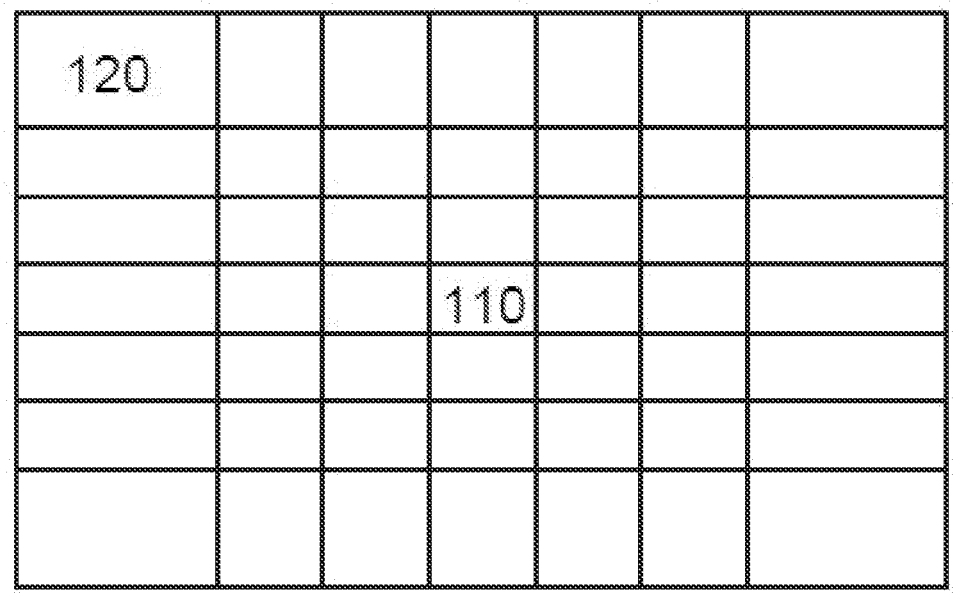
FIG. 1 schematically illustrates a flexible scale rasterization pattern.

Referring now to the drawings, wherein like reference numerals designate identical or corresponding parts throughout the several views, embodiments of the present disclosure are described.

As discussed above, one method of optimising the process of generating content for display is to selectively modify the image quality in different regions of the display image. For example, foveal rendering schemes provide for a method by which the image quality is to be lowered in areas of low visual impact. This can enable a reduction in the processing burden of the image generation process, or the generation of higher-quality content (as judged by a) using the same amount of processing resources.

Flexible scale rasterization (FSR) is an example of a method by which image content may be generated using a varying rasterization rate for different areas of the image content, with the rate being dependent upon the position of each area within the image content.

For example, FIG. 1 schematically illustrates a visualisation of an FSR encoding scheme to be applied to image generation. The area 100 represents the display screen (referred to as the window space), and it comprises a number of sub-areas such as the sub-areas 110 and 120. Each of the sub-areas represents a respective one of a plurality of same-sized areas of the raster space; that is, the rasterization process provides an equal level of detail for each of the sub-areas shown in FIG. 1. As a result, sub-areas having different sizes will have different display resolutions.

In particular, those areas which are smallest in the window space will have the highest level of detail—and the sub-area 120 will have a higher level of detail than the sub-area 110.

Figure 2:
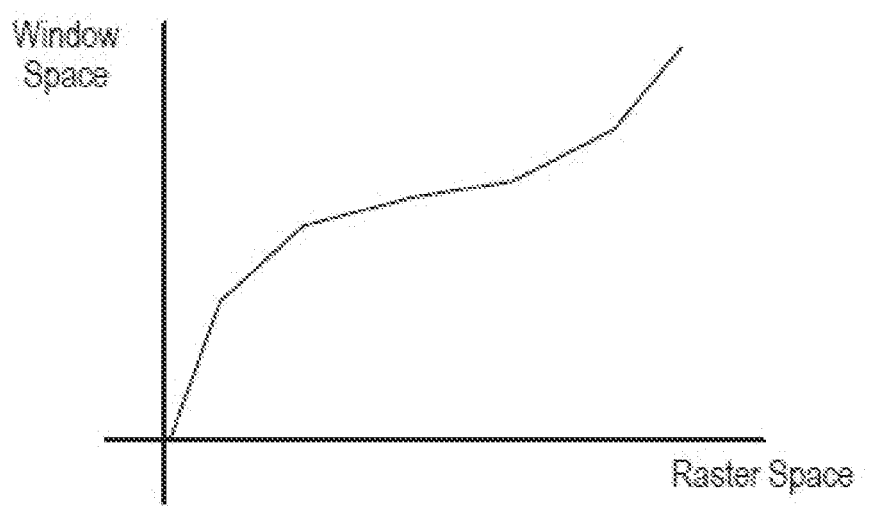
FIG. 2 schematically illustrates a function defining a parameter for flexible scale rasterization.

FSR may be implemented by defining a function for each axis (horizontal and vertical) that describes the correspondence between window space and raster space for that axis. FIG. 2 schematically illustrates an example of such a function.

In FIG. 2, the horizontal axis represents the raster space while the vertical axis represents the window space. A curve, formed by a number of straight-line segments, identifies a mapping between the two spaces in a given dimension—of course, a pair of such functions is required to define a mapping for an area. A steeper segment indicates a greater representation of the window space for a given amount of raster space (that is, a lower-resolution area), while a less-steep segment indicates that the given raster space corresponds to a smaller amount of the window space (that is, a higher-resolution area).

In some cases, it is considered that more than two functions may be defined as appropriate, for example so as to generate a more complex distribution of high-/low-resolution areas. In some embodiments, a smoothing is applied to the curve defined by the straight-line segments so as to reduce the appearance of sharp changes in rendering quality.

The generation of these functions may be performed in a number of ways—for example, in dependence upon eye-tracking data for a viewer, in dependence upon one or more elements of the content itself, and/or the properties of a display device for viewing the content. Any method of generating the functions may be considered appropriate, so long as it is possible to identify which regions of the display area should be higher-/lower-quality respectively.

For instance, eye-tracking data may be used to identify which parts of the display (or the content) are of interest to a user, or are being viewed by the user. For example, a display location may be identified, or one or more content elements, that a viewer is focused on. The two (or more) functions should then be defined so as to indicate a lower representation of window space for a given raster space in the area of focus/interest—that is, the function should have less-steep segments at this point.

In the example of defining functions in dependence upon one or more elements of the content itself, it is considered that some objects may be considered to be intrinsically of greater interest than other objects. For example, the protagonist within a computer game (in a third-person view) may be considered to be an element that should be displayed using a high quality representation.

There are a number of properties of a display device for viewing the content that may also (or instead) be considered when identifying image regions that should be rendered with a lower quality. For example, the display may comprise regions with different resolutions, or some parts of the display may not be able to be focused on by a user due to their location (such as a screen or screen area that occupies the user's peripheral in a head-mountable display device).

Figure 3:
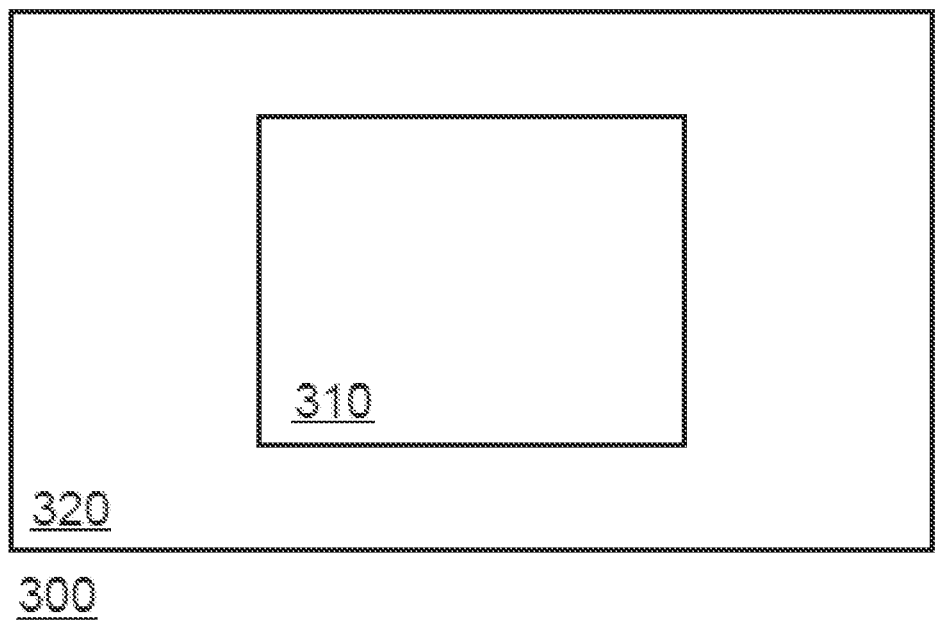
FIG. 3 schematically illustrates a display rendered using flexible scale rasterization pattern of FIG. 1.

FIG. 3 schematically illustrates an example of a screen that displays an image generated according to the FSR encoding scheme of FIG. 1. The screen 300 comprises a high-quality area 310 and a low-quality area 320, with these of course being relative terms rather than placing any absolute limitations on the display properties in each of the areas.

For efficient rendering, FSR should be used for as much of the render pipeline as is possible; for instance, the Z-prepass, base pass/G-buffer rendering, a deferred lighting pass, and one or more post-fx passes. Each of these uses the output of previous passes as its input, and as such using FSR throughout streamlines the process.

While the use of FSR offers a number of advantages in the image rendering process, there are also drawbacks associated with making use of warped textures. In order to use these textures, one of two approaches have generally been used in previously proposed arrangements. The first of these is that of resolving (in other words, linearising or unwarping) the texture to a full-resolution target prior to its use. While this can be effective, and may be considered to be relatively simple due to shaders not needing to be modified, this is a hugely inefficient approach due to the increase in processing required.

The second approach is that of modifying the shader to sample the texture as if it were linear. This generally includes a modifying of the UVs in the shader to vary the sampling of the shader; this is often implemented using a look-up table. While this is more efficient than the first approach, this is still relatively inefficient as more shader instructions are required to be executed; this also increases the implementation complexity as the shaders need to be modified to account for the warping of the texture to be utilised.

Embodiments of the present disclosure therefore seek to provide the functionality and advantages of FSR without introducing significant inefficiencies or the need for end developers to modify shaders accordingly.

Figure 4:
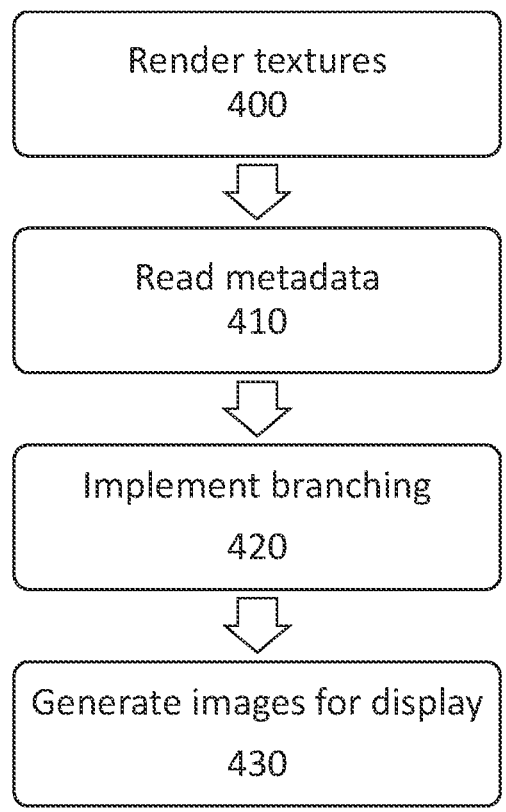
FIG. 4 schematically illustrates an exemplary method for generating images for display.

FIG. 4 schematically illustrates an exemplary method for generating images for display using textures rendered using FSR in a simplified and efficient manner.

A step 400 comprises rendering a texture using FSR, and generating metadata indicating information about the FSR state when the texture was rendered. Textures rendered using FSR are generally warped, as equal-sized portions of an image are not represented by an equal-sized area in the rasterized texture. The metadata can simply indicate that FSR was used to render the texture, for example using a flag, or it can contain (or otherwise indicate) more detailed information about the FSR. For instance, the metadata may indicate a mapping between the rasterized and original texture to enable the warped texture to be de-warped. An example of such information is a look-up table, which could be stored (for instance) at the end of the texture or using extra pixel width/height in the texture where available. Multiple forms of metadata may be provided in some embodiments, such as a flag and a look-up table as described.

Look-up tables may be implemented in any of a number of ways as appropriate for a particular implementation; a particular implementation may use a number of tables of different types in any combination as appropriate for that implementation. In a first example, a look-up table (or multiple look-up tables) may be provided for the resolving of a target texture. These may comprise either screenspace locations or UVs for enabling an accurate look-up in the warped texture. In the former case, the locations may be indicated using a horizontal table and a vertical table that are sampled at each screen location.

A second example is that of a table which indicates the inverse operation for the warping of the target—in other words, the operation to unwarp the target texture. A third example is that of a look-up table that indicates a resolution scale at each screen location, the resolution being represented by a value that indicates the scale at that location between a minimum and maximum scale value. This third example may be particularly useful for altering kernel sizes for filters when applying post-processing effects to warped textures, for instance.

A step 410 comprises reading the metadata at a shader compiler to identify one or more properties of the texture in respect of FSR being performed. This may be performed at the same device as the rendering of the texture, or at a separate device as appropriate for a given implementation. For instance, the texture may be pre-rendered before distribution to processing devices that generate images for display. In some embodiments, the shader compiler may be operated to compile a shader in advance of its use—this may be performed by referring to look-up tables within the shader microcode, for instance. This compiled shader may then be distributed to a number of devices for use. Alternatively, or in addition, shader compiling may be performed for each instance of a shader—for instance, being performed locally at the device that is to use the shader.

A step 420 comprises the implementation of a branching within one or more shaders to account for any FSR that has been used to render textures. The implementation of the branching comprises the replacement of code in the shader where appropriate to enable the shader to handle FSR and non-FSR textures as required.

Based upon the metadata associated with the texture (or the lack of metadata), the modified shader can perform a default texture sample (if metadata is absent, or indicates no FSR was used to render the texture) or a modified texture sample (if metadata indicates the use of FSR). This modified texture sample performs an appropriate FSR resolve based upon information derived from the metadata about the FSR state. An FSR resolve may be any operation that accounts for the warp of the texture—for instance, this may be a linearisation of the texture.

In some embodiments, this branching may be implemented using function shaders. This comprises the use of a microcode jump to a different shader address—in other words, a redirection to a shader function that is used to handle textures with particular FSR properties. Alternatively, or in addition, the branching may be implemented using a static branching approach. This may be provided using a microcode jump to another part of the shader, thereby causing specific portions of the shader code to be executed in a particular order.

While in some embodiments the type of branching may be selected arbitrarily, in some cases the shader itself may be more suited to a particular type of branching due to the type of operations being performed or the like. For instance, a shader with a greater number of scalar registers in use may be more suited to the use of static branching than dynamic branching. This can reduce the bottlenecks associated with using too many scalar registers (as the dynamic branching would use more scalar registers than static branching), thereby increasing performance of the shader.

In some embodiments, an analysis of shaders may be performed so as to determine a preferred branching type. This may be performed in advance in some cases; alternatively, or in addition, an analysis may be performed of a number of modified shaders to identify if a modified shader has an acceptable performance level or to identify which of a plurality of candidates has the best performance (or satisfies some other metric). This may be implemented by performing a statistical analysis of a shader for scalar/vector register usage or the presence of bottlenecks and a determination of their causes, for instance. This could be performed based upon an analysis of the shader code, and/or by executing a shader using one or more sample textures to measure performance.

In some embodiments, the shader compiler may be operable to use one or more of each of these branching methods as appropriate for a given texture and shader combination.

A step 430 comprises generating images for display comprising the obtained texture, the generation of images including the use of one or more shaders comprising the branching. The generated images may comprise textures which were rendered FSR alongside textures which were rendered without.

This method, and those of other embodiments of the present disclosure, may be further advantageous in that no changes are required to be made by the end developer (that is, the developer of the content which uses the shaders to generate images for display). Instead, the shader compiler will insert code where necessary based upon the metadata associated with the textures. Such methods may also be advantageous with respect to shader pre-processor methods as they would not require the end developer to wrap samples of the texture with macros that account for the warping.

As noted above, the metadata can be provided in any of a number of formats. While in some cases the metadata can be provided as a part of the texture, or alongside the texture, in some embodiments it may be advantageous to provide a separate data file that includes FSR information for a number of textures. For instance, a file could be provided that lists FSR information for one or more textures (including the use of flags or look-up tables) that can be accessed independently of the texture or textures to which the FSR data corresponds. This may be particularly useful in the case that a plurality of textures each share FSR characteristics—for instance, if the same rasterization scheme is used for a plurality of textures. This may arise when encoding a number of textures for similar models, for example, as the same areas in each texture are likely to be assigned the same level of detail.

While the discussion above relates to the provision of metadata on a per-texture basis, in some embodiments it may be advantageous to provide metadata on a per-tile basis for a plurality of tiles within the texture. This can enable a more flexible approach in which FSR can be used for portions of a texture rather than the whole texture. In response to this, the shader compiler can control shader operation so as to perform a resolving of the texture on a per-tile basis rather than resolving the entire texture. This can increase the efficiency of the shading process in the case in which FSR is only used for a portion of the texture.

In some embodiments, shaders may also be modified to generate a different output in addition to any of the above processing. This may be particularly useful when a plurality of shaders are used in sequence to apply different effects. In such an embodiment, it may be advantageous to modify a shader to cause it to output metadata indicating how the texture or FSR state of the texture has changed within the shader. In some cases, this output data may be the same as the input data (for instance, if no further warping or unwarping has been performed). However, in other cases the operation of a shader may cause areas of an image to have a changed resolution which can be reflected in the FSR state metadata. By modifying a shader to output information about these changes, later shading operations can be performed more accurately and reliably. The output may be a modified version of the input metadata, or additional metadata indicating the effect of the operations performed on the texture, for instance. While embodiments of the present disclosure may be implemented utilising software exclusively, it is also considered that hardware acceleration for one or more steps may offer advantages in the execution of the shading process. For instance, in some embodiments the generation and/or writing of the metadata at the time of rasterizing the texture may be accelerated using hardware. Alternatively, or in addition, the read of the metadata may be accelerated in the same manner. This hardware acceleration may be performed in a similar manner to that in which UV offsets, level-of-detail, or texture dimensions can be selected in a texture sampler in the shader.

For instance, it may be advantageous in a number of embodiments that the linearisation of the texture may be performed as a part of the final rendering operations (such as upscaling, colour/gamma transforms, and reprojection). In these embodiments the texture could be passed to the hardware, without being unwarped, with corresponding metadata about the FSR state. The rendering hardware can be modified to perform the unwarping alongside these other operations, which can lead to a performance increase for the system compared to a software-only implementation. As a look-up table operation, the modification to include the unwarping process may be a straightforward one.

Figure 5:
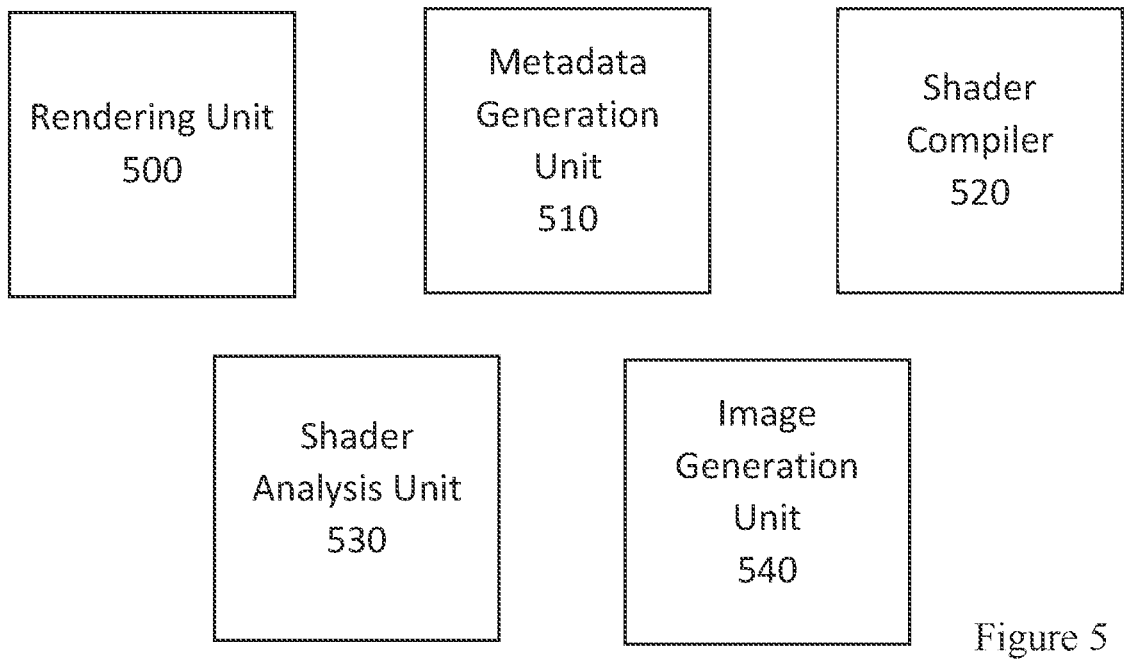
FIG. 5 schematically illustrates an image processing system operable to generate one or more images for display.

FIG. 5 schematically illustrates an image processing system operable to generate one or more images for display, the system comprising a rendering unit 500, a metadata generation unit 510, a shader compiler 520, an optional shader analysis unit 530, and an image generation unit 540. These functional units may be implemented using hardware associated with multiple devices, rather than being limited to embodiments in which a single device (such as a computer or games console) implements the functions of each of these units.

The rendering unit 500 is operable to render one or more of a plurality of textures using flexible scale rasterization, FSR. In some embodiments these textures may correspond to one or more video game elements, although the techniques may be equally applicable to any content to be rendered. For instance, these textures may be generated as assets for any virtual content that is to be rendered for display to a viewer.

The metadata generation unit 510 is operable to generate metadata indicating one or more properties of the FSR used to render a corresponding texture. In some embodiments the metadata comprises a flag indicating the use of FSR when rendering a corresponding texture. Alternatively, or in addition, the metadata may comprise a look-up table describing a warping of a corresponding texture due to the use of FSR. The metadata may be embedded in the texture, such as in the margins of the texture that are otherwise unused; alternatively, or in addition, metadata is provided as a part of the texture file itself (that is, stored as data in the texture file rather than being embedded in the texture itself).

In some embodiments, the metadata generation unit 510 is operable to generate metadata indicative of one or more properties of the FSR used to render each of a plurality of textures. This may be performed in any suitable manner for a given implementation; a first example is that of providing a file (not stored in association with any particular texture) that comprises information about the FSR for a plurality of textures. A second example is that of data being encoded with a texture (either embedded or otherwise included as a part of the texture file) that indicates FSR properties and one or more other textures that share those same properties. In some cases, metadata may be associated with a particular texture that indicates the location of FSR information for that texture—such as referencing a data file or another texture. This may be advantageous in the case of textures corresponding to similar elements within content, as it may be the case that a similar FSR scheme is used for each of those textures.

The shader compiler 520 is operable to read the metadata, and to modify a shader to enable a texture sampling to be performed that includes an FSR resolve where the metadata indicates that a corresponding texture has been rendered with FSR. In some embodiments, the shader compiler 520 is operable to modify a plurality of shaders in a graphics pipeline. The FSR resolve may comprise a linearisation of the rendered texture, or any other process that reduces or otherwise accounts for the warping of the texture as rendered.

The optional shader analysis unit 530 is operable to perform an analysis of a shader to determine the type of modification to be applied by the shader compiler. In the examples discussed above, the type of modification is considered to be static or dynamic branching but other types of modification may also be considered (for instance, modification to be compatible with a particular metadata format). The shader analysis unit 530 may be operable to perform a statistical analysis of the shader code and/or execute a shader using one or more sample textures to determine the performance of the shader. This may be performed for the shader being modified prior to or after the modification is performed by the shader compiler. In some embodiments, the shader compiler 520 may be operable to generate one or more candidate modified shaders using respective types of modification, and the shader analysis unit 530 is operable to analyse each of the candidate modified shaders and select a preferred type of modification in dependence upon the analysis. For instance, the shader compiler could generate modify a shader to generate two candidates (one with static and one with dynamic branching) which are each analysed to identify which offers the best performance or satisfies some other metric (such as having the smallest size or greater reliability).

The image generation unit 540 is operable to generate an image for display using at least one modified shader, the generated image including one or more of the plurality of textures. This image may be displayed, for example at a television or a head-mountable display device, and/or may be stored for display at a later time.

The arrangement of FIG. 5 is an example of a processor (for example, a GPU and/or CPU located in a games console or any other computing device) that is operable to generate one or more images for display, and in particular is operable to:

a. render one or more of a plurality of textures using flexible scale rasterization, FSR;
b. generate metadata indicating one or more properties of the FSR used to render a corresponding texture;
c. read the metadata, and to modify a shader to enable a texture sampling to be performed that includes an FSR resolve where the metadata indicates that a corresponding texture has been rendered with FSR;
d. generate an image for display using at least one modified shader, the generated image including one or more of the plurality of textures.

In embodiments of the present disclosure, the arrangement of FIG. 5 may be implemented using two or more processors or processing units. These may be located at different devices, such as a computer being used to render one or more textures using FSR and a separate computer being used to generate images for display. The rendered textures may be transferred from the first computer to the second using removable storage media, for instance, or a network connection.

Figure 6:
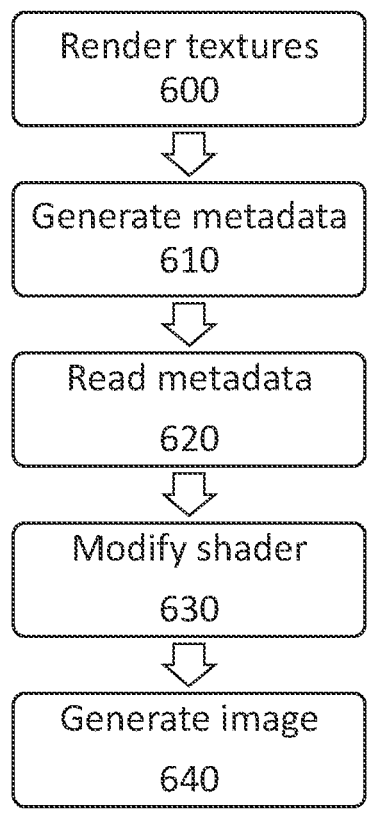
FIG. 6 schematically illustrates a method for generating one or more images for display.

FIG. 6 schematically illustrates a method for generating one or more images for display.

A step 600 comprises rendering one or more of a plurality of textures using flexible scale rasterization, FSR.

A step 610 comprises generating metadata indicating one or more properties of the FSR used to render a corresponding texture.

A step 620 comprises reading the metadata at a shader compiler.

A step 630 comprises modifying a shader to enable a texture sampling to be performed that includes an FSR resolve where the metadata indicates that a corresponding texture has been rendered with FSR.

A step 640 comprises generating an image for display using at least one modified shader, the generated image including one or more of the plurality of textures.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. An image processing system operable to generate one or more images for display, the system comprising:
   a rendering unit operable to render one or more of a plurality of textures using flexible scale rasterization, FSR;
   a metadata generation unit operable to generate metadata indicating one or more properties of the FSR used to render a corresponding texture;
   a shader compiler operable to read the metadata, and to modify a shader to enable a texture sampling to be performed that includes an FSR resolve where the metadata indicates that a corresponding texture has been rendered with FSR; and
   an image generation unit operable to generate an image for display using at least one modified shader, the generated image including one or more of the plurality of textures.
2. A system according to clause 1, wherein the textures correspond to one or more video game elements.
3. A system according to any preceding clause, wherein the metadata comprises a flag indicating the use of FSR when rendering a corresponding texture.
4. A system according to any preceding clause, wherein the metadata comprises a look-up table describing a warping of a corresponding texture due to the use of FSR.
5. A system according to any preceding clause, wherein the metadata is embedded in the texture.
6. A system according to any preceding clause, wherein the metadata is provided as a part of the texture file.
7. A system according to any preceding clause, wherein the metadata generation unit is operable to generate metadata indicative of one or more properties of the FSR used to render each of a plurality of textures.
8. A system according to any preceding clause, wherein the shader compiler is operable to modify a plurality of shaders in a graphics pipeline.
9. A system according to any preceding clause, wherein the FSR resolve comprises a linearisation of the rendered texture.
10. A system according to any preceding clause, comprising a shader analysis unit operable to perform an analysis of a shader to determine the type of modification to be applied by the shader compiler.
11. A system according to clause 10, wherein the shader analysis unit is operable to perform a statistical analysis of the shader code and/or execute a shader using one or more sample textures to determine the performance of the shader.
12. A system according to clause 10 or 11, wherein
    the shader compiler is operable to generate one or more candidate modified shaders using respective types of modification, and
    the shader analysis unit is operable to analyse each of the candidate modified shaders, and select a preferred type of modification in dependence upon the analysis.
13. A method for generating one or more images for display, the method comprising:
    rendering one or more of a plurality of textures using flexible scale rasterization, FSR;
    generating metadata indicating one or more properties of the FSR used to render a corresponding texture;
    reading the metadata at a shader compiler;
    modifying a shader to enable a texture sampling to be performed that includes an FSR resolve where the metadata indicates that a corresponding texture has been rendered with FSR; and
    generating an image for display using at least one modified shader, the generated image including one or more of the plurality of textures.
14. Computer software which, when executed by a computer, causes the computer to carry out the method of clause 13.
15. A non-transitory machine-readable storage medium which stores computer software according to clause 14.

The invention claimed is:

1. An image processing system operable to generate one or more images for display, the system comprising:
   a processor and a non-transitory machine-readable storage medium storing instructions that, when executed by the processor, cause the image processing system to:
   render one or more of a plurality of textures using flexible scale rasterization, FSR, wherein FSR includes a method by which image content is generated using a varying rasterization rate for different areas of the image content, with the rate being dependent upon the position of each area within the image content;
   generate metadata indicating one or more properties of the FSR used to render a corresponding texture;
   to read the metadata, and modify a shader to enable a texture sampling to be performed that includes an FSR resolve where the metadata indicates that a corresponding texture has been rendered with FSR; and
   generate an image for display using at least one modified shader, the generated image including one or more of the plurality of textures.

2. The system of claim 1, wherein the textures correspond to one or more video game elements.

3. The system of claim 1, wherein the metadata comprises a flag indicating the use of FSR when rendering a corresponding texture.

4. The system of claim 1, wherein the metadata comprises a look-up table describing a warping of a corresponding texture due to the use of FSR.

5. The system of claim 1, wherein the metadata is embedded in the texture.

6. The system of claim 1, wherein the metadata is provided as a part of the texture file.

7. The system of claim 1, wherein the metadata is indicative of one or more properties of the FSR used to render each of a plurality of textures.

8. The system of claim 1, wherein a plurality of shaders in a graphics pipeline are modified.

9. The system of claim 1, wherein the FSR resolve comprises a linearisation of the rendered texture.

10. The system of claim 1, wherein the processor and the non-transitory machine-readable storage medium storing instructions that, when executed by the processor, further cause the image processing system to:
perform an analysis of a shader to determine the type of modification to be applied by the shader compiler.

11. The system of claim 10, wherein the processor and the non-transitory machine-readable storage medium storing instructions that, when executed by the processor, further cause the image processing system to:
perform a statistical analysis of the shader code and/or execute a shader using one or more sample textures to determine the performance of the shader.

12. The system of claim 10, wherein the processor and the non-transitory machine-readable storage medium storing instructions that, when executed by the processor, further cause the image processing system to:
generate one or more candidate modified shaders using respective types of modification, and
analyse each of the candidate modified shaders, and select a preferred type of modification in dependence upon the analysis.

13. A method for generating one or more images for display, the method comprising:
rendering one or more of a plurality of textures using flexible scale rasterization, FSR, wherein FSR includes a method by which image content is generated using a varying rasterization rate for different areas of the image content, with the rate being dependent upon the position of each area within the image content;
generating metadata indicating one or more properties of the FSR used to render a corresponding texture;
reading the metadata at a shader compiler;
modifying a shader to enable a texture sampling to be performed that includes an FSR resolve where the metadata indicates that a corresponding texture has been rendered with FSR; and
generating an image for display using at least one modified shader, the generated image including one or more of the plurality of textures.

14. A non-transitory machine-readable storage medium which stores computer software which, when executed by a computer, causes the computer to perform a method for generating one or more images for display, the method comprising:
rendering one or more of a plurality of textures using flexible scale rasterization, FSR, wherein FSR includes a method by which image content is generated using a varying rasterization rate for different areas of the image content, with the rate being dependent upon the position of each area within the image content;
generating metadata indicating one or more properties of the FSR used to render a corresponding texture;
reading the metadata at a shader compiler;
modifying a shader to enable a texture sampling to be performed that includes an FSR resolve where the metadata indicates that a corresponding texture has been rendered with FSR; and
generating an image for display using at least one modified shader, the generated image including one or more of the plurality of textures.

* * * * *